(12) United States Patent
Boudikian et al.

(10) Patent No.: US 11,570,864 B2
(45) Date of Patent: Jan. 31, 2023

(54) METHOD FOR LIMITING CURRENT IN-RUSH IN AUTOMOTIVE LIGHTING DEVICES

(71) Applicant: VALEO VISION, Bobigny (FR)

(72) Inventors: David Boudikian, Bobigny (FR); Clement Fabris, Bobigny (FR); Jose Afonso, Bobigny (FR)

(73) Assignee: VALEO VISION, Bobigny (FR)

( * ) Notice: Subject to any disclaimer, the term of this patent is extended or adjusted under 35 U.S.C. 154(b) by 43 days.

(21) Appl. No.: 17/416,275

(22) PCT Filed: Dec. 5, 2019

(86) PCT No.: PCT/EP2019/083852
§ 371 (c)(1),
(2) Date: Jun. 18, 2021

(87) PCT Pub. No.: WO2020/126522
PCT Pub. Date: Jun. 25, 2020

(65) Prior Publication Data
US 2022/0053620 A1    Feb. 17, 2022

(30) Foreign Application Priority Data
Dec. 21, 2018   (EP) .................................... 18215631

(51) Int. Cl.
| | |
|---|---|
| *H05B 45/10* | (2020.01) |
| *H05B 45/3725* | (2020.01) |
| *H05B 45/50* | (2022.01) |
| *H05B 45/325* | (2020.01) |
| *H02H 9/00* | (2006.01) |
| *H02M 3/156* | (2006.01) |

(52) U.S. Cl.
CPC ......... *H05B 45/3725* (2020.01); *H02H 9/002* (2013.01); *H02M 3/156* (2013.01); *H05B 45/325* (2020.01); *H05B 45/50* (2020.01)

(58) Field of Classification Search
CPC ...... H05B 45/10; H05B 45/30; H05B 45/325; H05B 45/3725; H05B 45/50; H05B 47/10; H02H 9/002; H02M 3/156
See application file for complete search history.

(56) References Cited

U.S. PATENT DOCUMENTS

| | | |
|---|---|---|
| 2016/0081171 A1 | 3/2016 | Ichikawa |
| 2016/0359405 A1 | 12/2016 | Li et al. |
| 2018/0160515 A1 | 6/2018 | Ichikawa |
| 2019/0053341 A1* | 2/2019 | Stoeger .................. H05B 45/10 |

OTHER PUBLICATIONS

International Search Report dated Feb. 4, 2020 in PCT/EP2019/083852 filed on Dec. 5, 2019, 3 pages.

* cited by examiner

*Primary Examiner* — Jimmy T Vu
(74) *Attorney, Agent, or Firm* — Oblon, McClelland, Maier & Neustadt, L.L.P.

(57) ABSTRACT

A method for limiting current in-rush in automotive lighting devices. By controlling the state of a switching circuit that is used to selectively connect a power supply to an automotive lighting device, the invention allows for selectively limiting the intensity of the current that is supplied to the lighting device. In accordance with preferred embodiments, this advantage is achieved by relying on electronic components that are nowadays used for different purposes.

20 Claims, 1 Drawing Sheet

METHOD FOR LIMITING CURRENT IN-RUSH IN AUTOMOTIVE LIGHTING DEVICES

Figure 1:
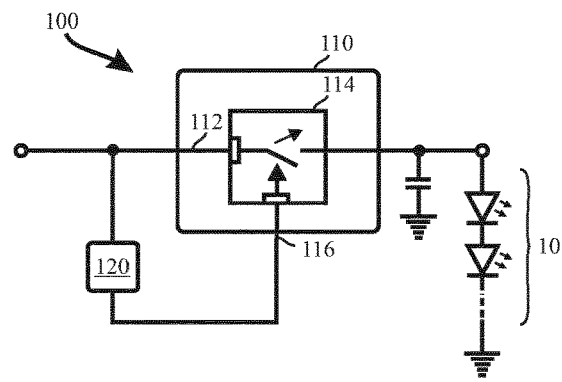

The invention lies in the field of driver devices for automotive lighting devices, and in particular for automotive lighting devices involving electroluminescent components, such as light emitting diodes, LEDs.

It is increasingly common to use electroluminescent semiconductor components, such as light emitting diodes, LEDs in automotive lighting applications. LEDs are small components capable of producing beams having high luminosity at relatively low supply current intensities. Using LEDs, interesting lighting contours may be designed, while at the same time both space and electrical power is saved, as compared to incandescent light sources. When a voltage difference of a value equal or larger than a LED's forward voltage is applied to its two terminals, an electrical current flow through the LED and photons are emitted. Generally, the luminescence of a LED is an increasing function of the electrical current intensity that passes through it. As the luminescence is required to conform to predetermined regulations, it is important to carefully drive the intensity of the electrical current supplied to LEDs. It is known to use driver devices for driving the power supply of a LED, which generally use a DC/DC converter circuit to transform an electrical current having a first intensity, as supplied for example by an internal source of an automotive vehicle, such as a battery, into an electrical current having a second intensity, which is appropriate to power the LEDs.

When a lighting function using such a driver device is switched on, a current in-rush having an intensity that is larger than the average input current intensity is generally observed. This is due, for example but not only, to the capacitors in the converter circuit, which need to charge and which therefore draw a large electrical current initially. The in-rush current may translate may be falsely detected as an overload on the LED driver by the automotive vehicles body controller module. The latter may thus rais a false alert and disable the driver.

This problem also arises in architectures that use a single switched mode converter circuit having multiple power supply inputs that may be selectively used, for example to supply different current intensities to different lighting functions of an automotive vehicle, such as parking lights, PL, turn indicator, TI or other. The resources of the converter circuit are shared over time by different lighting functions. When the input power supply of the converter circuit is switched from a first to a second input, an in-rush current may be observed. The issue arises therefore not only upon initialisation of the lighting function, but routinely at any time when power inputs are switched, which is a common process.

It is an objective of the present invention to provide a method and system which overcomes at least some of the disadvantages of the prior art.

In accordance with a first aspect of the invention, a control method for a driver device of an automotive lighting device is proposed. The driver device is suitable for supplying electricity to said lighting device and comprises a first input for receiving an electricity supply, a switching circuit for selectively connecting said first input to the lighting device and for selectively limiting the intensity of the electric current provided to the lighting device, and a second input for receiving a control signal for the switching circuit. The control method is remarkable in that it comprises the steps of:

detecting the presence of an electricity supply on said first input using a detection circuit;

upon said detection, controlling said switching circuit using a control signal, so that said first input is connected to the lighting device, and so that the intensity of the electric current flowing through the first input is limited to a predetermined value.

Preferably, upon said detection, the controlling step may comprise limiting the intensity of the electric current flowing through the first input to a predetermined value for a predetermined timespan.

The controlling step may preferably comprise the cancellation of said limitation after said predetermined timespan has elapsed. After said predetermined timespan, the switching circuit may preferably be controlled to connect said first input to said lighting device.

Preferably, the switching circuit may comprise a field effect transistor having a linear mode. Upon said detection, the controlling step may further preferably comprise driving the transistor into linear mode using said control signal, so that the transistor acts as a resistance that limits the intensity of the electric current provided to the lighting device.

Preferably, the switching circuit may comprise a capacitor.

The control signal may preferably comprise a pulse width modulated, PWM, signal.

Preferably, the electronic components of said switching circuit may at least partly implement a reverse current protection circuit of said driver device.

According to another aspect of the invention, a control method for a driver device of an automotive lighting device is proposed. The driver device is suitable for supplying electricity to said lighting device and comprises at least one first input for selectively receiving an of electricity supply, wherein each first input is associated with a switching circuit for selectively connecting said first input to the lighting device and for selectively limiting the intensity of the electric current flowing through the first input, the driver device further comprising at least one second input for receiving a control signal said switching circuit or switching circuits. The control method is remarkable in that it comprises the steps of:

detecting the presence of an electricity supply on one of said first inputs using a detection circuit;

upon said detection, controlling the corresponding switching circuit using a control signal, so that said first input is connected to the lighting device, and so that the intensity of the electric current flowing through the first input is limited to a predetermined value.

According to another aspect of the invention, a control method for a driver device of an automotive lighting device is proposed. The driver device is suitable for supplying electricity to said lighting device and comprises a plurality of first inputs for selectively receiving any of a plurality of electricity supplies, wherein each first input is associated with a switching circuit for selectively connecting said first input to the lighting device and for selectively limiting the intensity of the electric current flowing through the first input, the driver device further comprising a plurality of second inputs for receiving a control signal for each switching circuit. The control method is remarkable in that it comprises the steps of:

detecting the presence of an electricity supply on one of said first inputs using a detection circuit;

upon said detection, controlling the corresponding switching circuit using a control signal, so that said first input is connected to the lighting device, and so that the intensity of the electric current flowing through the first input is limited to a predetermined value.

According to yet another aspect of the invention a computer program is provided, which, when run on a computer, leads the computer to realize the method steps in accordance with aspects of the invention.

A computer program product is further provided. It comprises a computer readable medium on which the computer program in accordance with an aspect of the invention is stored.

According to a further aspect of the invention, a control system comprising a control unit and a driver device of an automotive lighting device is provided. The driver device is suitable for supplying electricity to said lighting device and comprises a first input for receiving an electricity supply, a switching circuit for selectively connecting said first input to the lighting device and for selectively limiting the intensity of the electric current provided to the lighting device, and a second input for receiving a control signal for the switching circuit. The control system is remarkable in that the control unit comprises:

- a detection circuit for detecting the presence of an electricity supply on said first input;
- a control signal generator which is configured for generating a control signal for controlling said switching circuit upon said detection, so that said first input is connected to the lighting device, and so that the intensity of the electric current provided to the lighting device is limited to a predetermined value.

The control unit may preferably comprise a microcontroller device operatively connected to said driver device.

Preferably, the driver device may comprise at least one DC/DC converter. The converter may preferably comprise a switched mode converter circuit. The converter may preferably comprise a buck architecture, a boost architecture or a combined buck/boost architecture. Preferably, the converter may be a Single Ended Primary Inductor Convertor, SEPIC.

By using the driver control method in accordance with aspects of the invention, it becomes possible to limit the intensity of the in-rush current that arises when for example a LED driver is switched on, or when one among a plurality of available power inputs is connected to the driver. The in-rush current is smoothed by driving a switch that connects the driver to the power input first into a linear mode, wherein it acts basically like a resistance, before fully closing it. While in linear mode, the switch opposes itself to the flow of the in-rush current. As the in-rush current intensity is limited, a false overload detection is avoided. By applying the method as described herein, it becomes thus for example possible to conform to existing automotive lighting regulations in scenarios where this was not possible using known methods. Field effect transistors are often used as power switched in reverse current protection circuits for LED drivers. The method in accordance with aspects of the invention may be advantageously implemented by using these existing hardware components instead of requiring the addition of further hardware components. Indeed, a MOSFET power switch may be driven into linear mode for a small time, by applying the appropriate control signal to its gate terminal.

Figure 2:
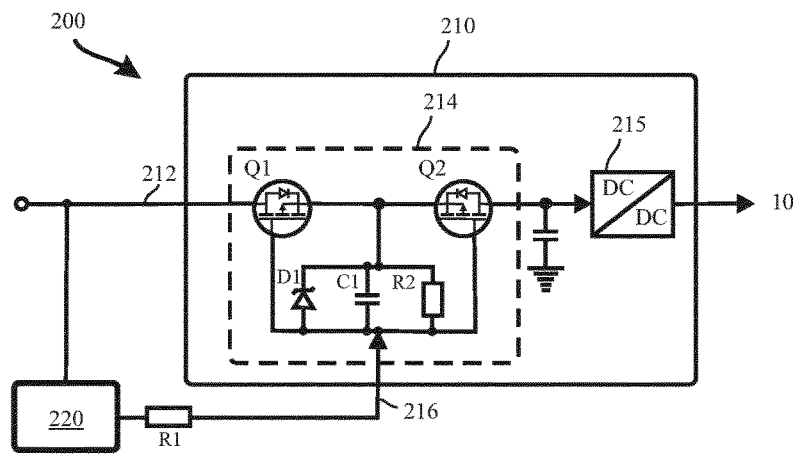
Figure 3:
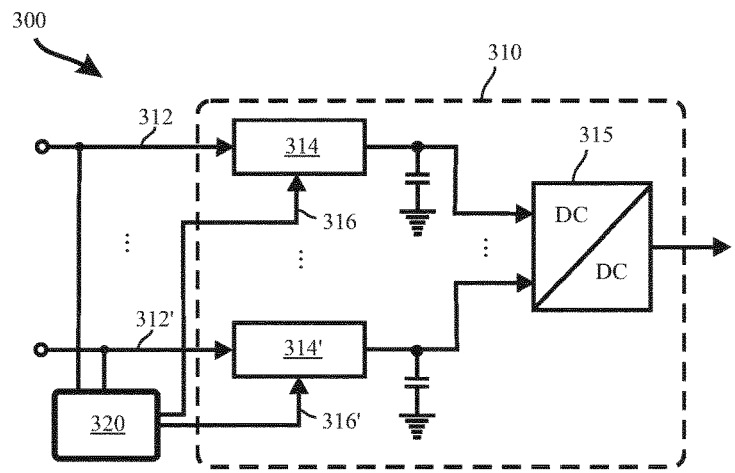

Several embodiments of the present invention are illustrated by way of figures, which do not limit the scope of the invention, wherein:

FIG. 1 provides a schematic illustration of system according to a preferred embodiment of the invention, for implementing the method according to a preferred embodiment of the invention;

FIG. 2 provides a schematic illustration of system according to a preferred embodiment of the invention, for implementing the method according to a preferred embodiment of the invention;

FIG. 3 provides a schematic illustration of system according to a preferred embodiment of the invention, for implementing the method according to a preferred embodiment of the invention;

This section describes features of the invention in further detail based on preferred embodiments and on the figures, without limiting the invention to the described embodiments. Unless otherwise stated, features of one described embodiment may be combined with additional features of another described embodiment. Similar features of the invention are referenced with similar reference numbers, wherein a reference number for a given feature is incremented by one hundred when switching from one embodiment of the invention to the next. For example, reference numbers 110, 210 and 310 each refer to a driver device as used in three different embodiments of the invention.

The description focuses on those aspects that are relevant for understanding the method and system in accordance with the invention. Driver devices and automotive lighting devices comprise other components that are well known in the art, which will not be explicitly mentioned. These include for example a heat dissipator, optical lenses, or structures for holding the respective components in place.

FIG. 1 illustrates a preferred embodiment of a control system 100 that includes a driver device 110 of an automotive lighting device 10. The lighting device is schematically illustrated as comprising a series string of light emitting diodes, LED, but the invention is not limited to this example. The driver device is suitable for supplying electricity to the lighting device and comprises electronic circuitry to that effect. In particular, the driver device comprises means for receiving a first input 112. The first input 112 is an electricity supply, as provided for example by an electricity source that is internal to the automotive vehicle, such as a battery. The driver device further comprises a switching circuit 114 for selectively connecting said first input to the lighting device and for selectively limiting the intensity of the electric current flowing through the first input. In order to control the state of the switching circuit 114, a second input 116 for receiving a control signal for the switching circuit is provided. The driver device may further comprise other non-illustrated circuitry, for example a known converter circuit. The control method of the switching circuit is implemented by a controlling unit 120, which may for example be implemented using a microcontroller device programmed to that effect. The controlling unit 120 generates on one of its outputs, functionally connected to the switching circuit 114, a control signal that carries the controls addressed to the switching circuit. The control method comprises the steps of:

- detecting the presence of an electricity supply on said first input using a detection circuit that is part of the controlling unit 120;
- upon said detection, controlling the switching circuit 114, so that the power supply input 112 is connected to the lighting device, and so that the intensity of the electric current flowing through the first input is limited to a predetermined value.

The predetermined value is a current threshold which may be implemented by various electrical components of the switching circuit. Typically, the limitation is active for about 1 to 2 milliseconds, after which the in-rush phenomenon is generally no longer noticeable. The limitation may as well be active for a shorter or longer period. Past this predetermined time, the control signal 116 closes the switching circuit completely without limiting the supplied current intensity.

FIG. 2 illustrates another embodiment of power supply system 200 for implementing a preferred embodiment of the method in accordance with aspects of the invention. The system 200 includes a driver device 210 of an automotive lighting device 10. The driver device is suitable for supplying electricity to the lighting device and comprises electronic circuitry to that effect. In particular, the driver device comprises means for receiving a first input 212. The first input 212 is an electricity supply, as provided for example by an electricity source that is internal to the automotive vehicle, such as a battery. The driver device further comprises a switching circuit 214 for selectively connecting said first input to the lighting device and for selectively limiting the intensity of the electric current provided to the lighting device. In order to control the state of the switching circuit 214, a second input 216 for receiving a control signal for the switching circuit is provided. The driver device may further comprise other circuitry, for example a known converter circuit 215. Once the power supply 212 is connected through the switching circuit 214 to the lighting device 10, the converter circuit 215 converts the input current into a charge current of appropriate intensity for powering the lighting device. The converter circuit may for example comprise a buck converter for lowering the power, a boost converter for raising the power, or a combined boost/buck architecture. It is for example known in the art to use switched mode converter circuits such as a single ended primary inductor converter, SEPIC. In such converters, the performance of the converter is controlled using a switching signal that is not illustrated in the context of the present invention. The switching signal is applied to a control switch of the converter circuit, thereby defining its duty cycle. The control method of the switching circuit 214 is implemented by a controlling unit 220, which may for example be implemented using a microcontroller device programmed to that effect. The controlling unit 220 generates on one of its outputs, functionally connected to the switching circuit 214 through resistance R1, a control signal 216 that carries the controls addressed to the switching circuit. The control method comprises the steps of:

detecting the presence of an electricity supply on said first input using a detection circuit that is part of the controlling unit 220;
 upon said detection, controlling the switching circuit 214, so that the power supply input 212 is connected to the lighting device, and so that the intensity of the electric current flowing through the first input is limited to a predetermined value.

The switching circuit 214 shown in FIG. 2 is also used to implement a reverse current protection for the converter circuit 215. The state of the MOSFET transistors Q1 and Q2 is driven by control signal 216 through the circuit implemented by the Zener diode D1, the capacitor C1 and the resistance R2. Advantageously, the control signal 216 is a pulse width modulated PWM signal, which is a binary periodic signal having an ON state and an OFF state, and which is characterized by its duty cycle, i.e. the ratio between the duration of the ON state and the total period duration. By adapting the amplitude of the PWM signal, for example using a dedicated levelling circuit, an/or by changing the duty cycle using the controlling unit 220, different average values of the control signal 216 are achievable. Therefore, the PWM signal is suitable for driving the power switch Q1 selectively into either closed, open or linear mode, as required by the method in accordance with aspects of the invention. Applying the PWM signal to the capacitor C1, one terminal of which is connected to the gate of Q1, further helps to filter and smooth the current in-rush that is detected on input 212.

The embodiment 300 shown in FIG. 3 comprises a driver device 310 in which a single converter circuit 315 is shared in time by a plurality of lighting functions, wherein each lighting function may require one of a plurality of available power inputs 312, 312', of which two are illustrated, without limiting the invention to the number of two. Each power supply input 312, 312' is associated with a dedicated switching circuit 314, 314', of which each one is akin to the switching circuits described in previous embodiments. The switching circuits are controlled by respective control signals 316, 316', which are generated in this example by the common controlling unit 320, and which implement the same functionality that has been described for the control signals 116, 216 in the context of the previous embodiments. In another embodiment, separate controlling units may as well be used for generating the plurality of control signals.

Time shared converters are for example used in automotive lighting device. When a turn indicator, TI, and parking light, PL, function are both requested by the car, the converter supplies both the TI and PL LEDs using a time-sharing schedule and using the same input power supply, for example 312. When the TI is switched off, i.e. every 300 ms, input supply 312' must be used to supply power to the PL alone due to practical and regulation constraints. Once the TI comes back on, power is detected on input supply 312, which is then used to replace input 312'. There is thus a periodic switching between power supply inputs 312 and 312', which is implemented by controlling the switching circuits 314, 314' accordingly. In accordance with this embodiment of the invention, before the corresponding switching circuits 314, 314' go into their closed mode, they are driven for 1-2 ms into a linear mode using control signals 316 and 316' respectively, in which they act as a resistance in order to smooth the current in-rush that is otherwise fed forward to the converter circuit 315. In this scenario, the proposed method avoids the periodic in-rushes at the converter circuits input, which would otherwise be detected erroneously as driver failure due to input overload.

Based on the examples and illustrations that have been provided, a person with ordinary skills in the art will be able to provide a computer program for implementing the control process in accordance with aspects of the invention, without undue burden and without requiring further inventive skills.

It should be understood that the detailed description of specific preferred embodiments is given by way of illustration only, since various changes and modifications within the scope of the invention will be apparent to the skilled person. The scope of protection is defined by the following set of claims.

The invention claimed is:

1. A control method for a driver device of an automotive lighting device, wherein the driver device is suitable for supplying electricity to said lighting device and comprises a first input for receiving an electricity supply, a switching circuit for selectively connecting said first input to the lighting device and for selectively limiting the intensity of the electric current provided to the lighting device, and a second input for receiving a control signal for the switching circuit, wherein the method comprises the steps of:
- detecting the presence of an electricity supply on said first input using a detection circuit;
- upon said detection, controlling said switching circuit using a control signal, so that said first input is connected to the lighting device, and so that the intensity of the electric current flowing through the first input is limited to a predetermined value.

2. The method according to claim 1, wherein upon said detection, the controlling step comprises limiting the intensity of the electric current flowing through the first input to a predetermined value for a predetermined timespan.

3. The method according to claim 1, wherein the switching circuit comprises a field effect transistor having a linear mode, and wherein upon said detection, the controlling step comprises driving the transistor into linear mode using said control signal, so that the transistor acts as a resistance that limits the intensity of the electric current provided to the lighting device.

4. The method according to claim 1, wherein the switching circuit comprises a capacitor.

5. The method according to claim 1, wherein the control signal comprises a pulse width modulated, PWM, signal.

6. The method according to claim 1, wherein the electronic components of said switching circuit at least partly implement a reverse current protection circuit of said driver device.

7. The method according to claim 2, wherein the controlling step comprises the cancellation of said limitation after said predetermined timespan has elapsed.

8. The method according to claim 2, wherein the switching circuit comprises a field effect transistor having a linear mode, and wherein upon said detection, the controlling step comprises driving the transistor into linear mode using said control signal, so that the transistor acts as a resistance that limits the intensity of the electric current provided to the lighting device.

9. The method according to claim 2, wherein the switching circuit comprises a capacitor.

10. The method according to claim 2, wherein the control signal comprises a pulse width modulated, PWM, signal.

11. The method according to claim 2, wherein the electronic components of said switching circuit at least partly implement a reverse current protection circuit of said driver device.

12. The method according to claim 7, wherein the switching circuit comprises a field effect transistor having a linear mode, and wherein upon said detection, the controlling step comprises driving the transistor into linear mode using said control signal, so that the transistor acts as a resistance that limits the intensity of the electric current provided to the lighting device.

13. The method according to claim 7, wherein the switching circuit comprises a capacitor.

14. The method according to claim 7, wherein the control signal comprises a pulse width modulated, PWM, signal.

15. The method according to claim 7, wherein the electronic components of said switching circuit at least partly implement a reverse current protection circuit of said driver device.

16. A control method for a driver device of an automotive lighting device, wherein the driver device is suitable for supplying electricity to said lighting device and comprises a plurality of first inputs for selectively receiving any of a plurality of electricity supplies, wherein each first input is associated with a switching circuit for selectively connecting said first input to the lighting device and for selectively limiting the intensity of the electric current provided to the lighting device, the driver device further comprising a plurality of second inputs for receiving a control signal for each switching circuit, wherein the method comprises the steps of:
- detecting the presence of an electricity supply on one of said first inputs using a detection circuit;
- upon said detection, controlling the corresponding switching circuit using a control signal, so that said first input is connected to the lighting device, and so that the intensity of the electric current flowing through the first input is limited to a predetermined value.

17. A control system comprising a control unit and a driver device of an automotive lighting device, wherein the driver device is suitable for supplying electricity to said lighting device and comprises a first input for receiving an electricity supply, a switching circuit for selectively connecting said first input to the lighting device and for selectively limiting the intensity of the electric current provided to the lighting device, and a second input for receiving a control signal for the switching circuit, the control unit comprising:
- a detection circuit for detecting the presence of an electricity supply on said first input;
- a control signal generator which is configured for generating a control signal for controlling said switching circuit upon said detection, so that said first input is connected to the lighting device, and so that the intensity of the electric current flowing through the first input is limited to a predetermined value.

18. The control system according to claim 17, wherein the control unit comprises a microcontroller device operatively connected to said driver device.

19. The control system according to claim 17, wherein the driver device comprises at least one DC/DC converter.

20. The control system according to claim 18, wherein the driver device comprises at least one DC/DC converter.

* * * * *